T. C. WALTER.
Fruit-Drier.
No. 160,371. Patented March 2, 1875.
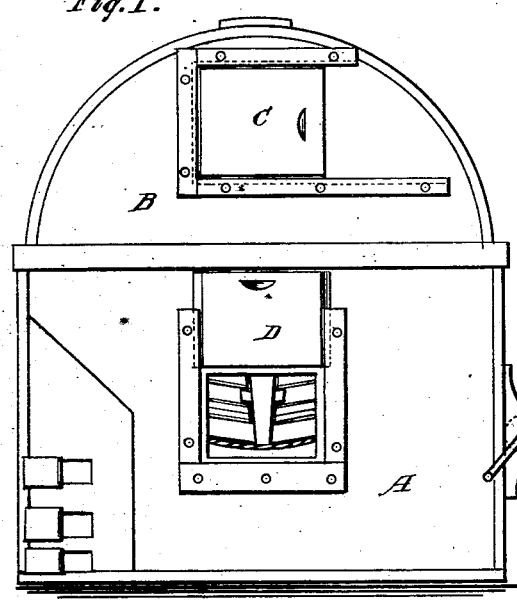
Fig. 1.
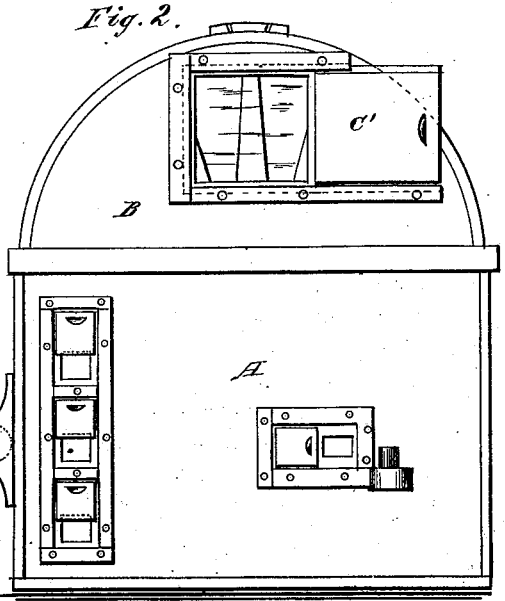
Fig. 2.
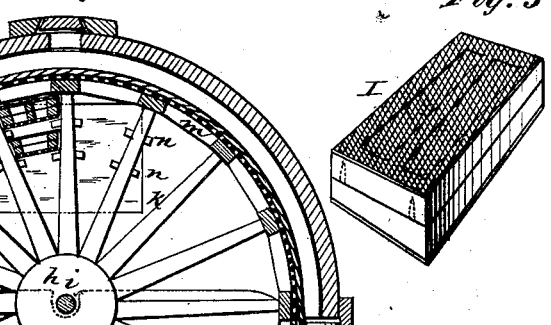
Fig. 3.
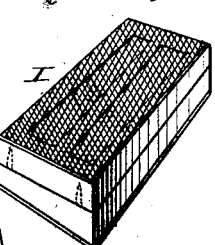
Fig. 4. Fig. 5. Fig. 6.
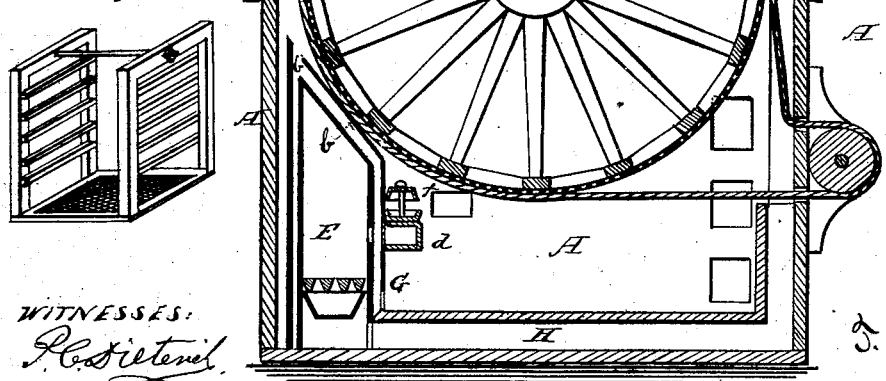
WITNESSES:
INVENTOR:
T. C. Walter
per
C. H. Watson
ATTORNEYS.
THE GRAPHIC CO. PHOTO-LITH. 39 & 41 PARK PLACE, N.Y.

UNITED STATES PATENT OFFICE.

THOMAS C. WALTER, OF SAN FRANCISCO, CALIFORNIA.

IMPROVEMENT IN FRUIT-DRIERS.

Specification forming part of Letters Patent No. 160,371, dated March 2, 1875; application filed January 30, 1875.

*To all whom it may concern:*

Be it known that I, THOMAS C. WALTER, of San Francisco, in the county of San Francisco and State of California, have invented certain new and useful Improvements in Device for Vaporating and Treating Vegetables and Fruit; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a device for drying and preserving fruit and other vegetables, as will be hereinafter more fully set forth.

In the annexed drawing, Figure 1 is a front elevation, Fig. 2 a rear elevation, and Fig. 3 a longitudinal vertical section, of my apparatus. Fig. 4 is an inside view, and Fig. 5 a perspective view, of one of the fruit-trays. Fig. 6 is a modification of the stationary boxes.

A represents the lower part of the shell, which may be of any suitable form and dimensions. The top B of the shell is made semicircular, as shown. The entire shell may be made of wood, provided with an interior lining, a, of tin-foil, which will retain the heat and vapor perfectly. In the front of the shell A B are two doors, C and D; the former, being near the top, and having glass inserted behind it, is simply for observation. A similar door, C′, is made for the same purpose in the back. The door D is for the purpose of inserting and removing the fruit-trays. At one end of the box A is placed a furnace, E, surrounded by a shell, G, to form a hot-air chamber, b. From the bottom of this chamber a flue, H, extends along the bottom of the shell, and up at the opposite end for a certain distance. This flue will conduct air from the inside of the box or shell to the hot-air chamber b, where it becomes again superheated or reheated, and passes back up into the box, forming a perfect and continuous circulation. The smoke from the furnace E passes into a pipe or chamber, d, extending across the shell A, and out at one end thereof. Over this pipe or chamber is placed a pan or steamer, f, to contain the peelings, &c., from the fruit, with enough water to form steam or vapor, which passes into the hot-air chamber b, mingles with the hot air therein, and passes into the drier, imparting additional flavor to the fruit being dried.

The fruit or vegetable to be dried is placed in boxes I I, each formed of two wooden frames, covered on one side with wire-cloth, and one reversed on top of the other. These frames are held together by means of corner-pins x x, as shown; and the boxes are inserted in a skeleton-wheel, constructed in the following manner: On a central shaft, i, are fastened two hubs, h h, from each of which radiate a series of arms, k k, connected at their outer ends by rims, and the corresponding arms of the two series connected by suitable cross-bars, over which is placed a band, m, of perforated sheet metal, wire-cloth, or other suitable material. On the arms k are fastened suitable cleats, n, to form ways for the reception of the boxes I. The ends of the shaft i have their bearings in the sides of the drier A B, and the wheel is revolved by means of an endless cord or belt, s, passing around the wheel, and through slots in the end of the drier, around a pulley or wheel, p, mounted in suitable bearings on the outside thereof, and revolved by means of a crank.

When the boxes are filled and placed in the wheel, and the furnace heated, the hot-air from the chamber b rises from the same to the top of the drier, and consequently creates greater pressure above than below. Hence the vapor from the fruit will descend and pass through the flue H into the hot-air chamber, become superheated, and again pass up into the drier. The vapor from the peelings in the pan f also mix therewith, and impart additional flavor to the fruit.

The wheel being kept revolving and changing the fruit constantly to different temperatures prevents the shriveling of the fruit, and causes it to become coated with a coating of sugar, driven out to the surface by the vapors.

The drier is of course provided with suitable apertures for regulating the admission of cold air, for expulsion of the vapors, and for the insertion of fuel in the furnace, as well as for draft purposes.

In place of the stationary boxes in the wheel, they may be made to swing upon pivots in such a manner as to always retain the same position while the wheel revolves, as shown in Fig. 6.

Having thus fully described my invention, what I claim as new, and desire to secure by Letters Patent, is—

1. The case A B, furnace E, chamber $b$, and flue H, in combination with steamer $f$ and pipe or chamber $d$, all constructed and arranged as and for the purpose herein specified.

2. The combination of the fruit-drier case A B, furnace E, exterior shell G, forming hot-air chamber $b$, and the flue H, as and for the purposes herein set forth.

In testimony that I claim the foregoing as my own I affix my signature in presence of two witnesses.

THOMAS C. WALTER.

Witnesses:
CHAS. O. JARCIOT,
S. SIMMONS.